UNITED STATES PATENT OFFICE.

FRANZ A. RODY, OF NEWARK, NEW JERSEY, ASSIGNOR TO METALLURGICAL COMPANY OF AMERICA, OF NEW YORK, N. Y., A CORPORATION OF NEW JERSEY.

TREATMENT OF FELDSPAR, LEUCITE, AND THE LIKE.

1,325,882.  Specification of Letters Patent.  Patented Dec. 23, 1919.

No Drawing.  Application filed May 18, 1915. Serial No. 28,895.

*To all whom it may concern:*

Be it known that I, FRANZ A. RODY, a subject of the Emperor of Germany, residing at and whose post-office address is No. 258 Van Buren street, Newark, county of Essex, State of New Jersey, have invented certain new and useful Improvements in the Treatment of Feldspar, Leucite, and the like; and I do hereby declare the following to be a full, clear, and exact description of the invention, such as will enable others skilled in the art to which it appertains to make and use the same.

The present invention which relates to a general method of separating the alkalis and alumina from naturally occurring silicates (such as feldspar, leucite, etc.,) refers more particularly to a process of obtaining the potassium compounds practically free from the sodium compounds usually accompanying it in these materials.

The invention is based on the discovery of a method of replacing sodium salts in solution by potassium salts and is the final step in my broader process of extracting the potassium compounds from feldspar, leucite, etc. This consists, briefly, in raising to a fusing temperature, a suitably proportioned mixture of the silicate and an alkaline-earth metal oxid, with or without added alkali, thereby freeing the alkali metal compounds and alumina in a water-soluble condition. These are dissolved out and the alumina precipitated by any suitable means, such as by passing carbon dioxid through the solution and filtering off the aluminum hydroxid. The solution consists, substantially of sodium and potassium salts in about the same relative proportion as are found in the original crude silicate.

The separation of dissolved sodium and potassium salts is a problem that is extremely difficult to solve in large commercial processes. I have discovered that if leucite is fused to a glass-like stringy mass (which occurs after it has been heated to approximately 1100° C. for a sufficient length of time), and when it is digested (preferably under pressure) in a finely ground condition, in a solution containing a mixture of appropriate easily soluble sodium and potassium salts (as, for instance, the carbonates, or hydroxids, as contained in the solution above referred to) the sodium in the dissolved sodium salts will replace the potassium in the fused ground leucite.

In order that the replacement above referred to may take place, it will be evident that the amount of the sodium compounds in the solution should correspond to the amount of the potassium compounds contained in the fused leucite, and that the mixture of sodium and potassium salts employed should not be used in such amount as would decompose the entire mass of the fused leucite and prevent the desired replacement from taking place. The present process is, accordingly, to be distinguished from such processes as involve decomposition of the mass of the leucite with resulting conversion of the silicate content thereof into an alkali metal silicate. In the replacement process of the present invention, in order that the desired separation of sodium and potassium compounds may take place, the amount of the mixture of sodium and potassium salts employed should be such that the sodium will replace the potassium of the fused leucite, with resulting decrease in the sodium content of the solution and corresponding increase in its potassium content and with a similar decrease in the potassium content of the fused leucite, and a corresponding increase in its sodium content.

What I claim is:

1. The method of replacing sodium in a solution of sodium and potassium salts by the potassium in leucite rock, which comprises fusing the leucite and digesting the fused product in a solution of easily soluble sodium and potassium salts, the amount of the sodium and potassium salts being such that sodium will replace potassium in the fused leucite, with resulting impoverishment of the solution in sodium and increase thereof in potassium content and with decrease of the fused leucite in the potassium and increase thereof in sodium content.

2. The method of replacing sodium in a solution of sodium and potassium salts by the potassium in leucite rock, which comprises sintering the leucite, reducing the product to power, adding to it a solution of easily soluble sodium and potassium salts and digesting, the amount of the sodium and potassium salts being such that sodium will replace potassium in the fused leucite, with resulting impoverishment of the solution in sodium and increase thereof in potassium content and with decrease of the fused leucite in potassium and increase thereof in sodium content.

3. The method of replacing sodium in a solution of sodium and potassium salts by the potassium in leucite rock, which comprises fusing the silicate, reducing the product to powder, adding to it a solution of easily soluble sodium and potassium salts, and digesting under pressure, the amount of the sodium and potassium salts being such that sodium will replace potassium in the fused leucite, with resulting impoverishment of the solution in sodium, and increase thereof in potassium content and with decrease of the fused leucite in potassium and increase thereof in sodium content.

In testimony whereof I affix my signature, in presence of two witnesses.

FRANZ A. RODY.

Witnesses:
H. M. BURKEY,
JEROME S. KATZ.